March 31, 1964  H. A. FREEMAN  3,127,460
METHOD OF VULCANIZING RETREADED TIRES
Filed Aug. 1, 1961  2 Sheets-Sheet 1

INVENTOR.
HAROLD A. FREEMAN
BY
J. B. Holden
ATTORNEY

INVENTOR.
HAROLD A. FREEMAN
BY
J. B. Holden
ATTORNEY

United States Patent Office 3,127,460
Patented Mar. 31, 1964

3,127,460
METHOD OF VULCANIZING RETREADED TIRES
Harold A. Freeman, Akron, Ohio, assignor to The Goodyear Tire & Rubber Company, Akron, Ohio, a corporation of Ohio
Filed Aug. 1, 1961, Ser. No. 128,420
3 Claims. (Cl. 264—315)

This invention relates to a method for recapping or retreading tires and, more particularly, to a method of preheating such tires outside the mold prior to completing the cure of such tires inside the mold.

In recapping and retreading tires according to the usual method, the crown of the tire is first rasped or otherwise roughened and a strip of semi-cured or raw rubber, called camelback, is placed on the periphery or crown of the carcass. The prepared tire is then placed in the curing mold wherein it is subjected to heat for a predetermined period of time during which the camelback is cured and vulcanized to the carcass of the tire. However, in order for the actual curing or vulcanizing of the camelback, that portion of the camelback adjacent the carcass or at the innerface between the carcass and camelback, must be heated to the vulcanizing temperature. In the usual method, the curing mold external of the tire carcass is provided with steam jackets for providing the vulcanizing heat, consequently many failures of recapped or retreaded tires are due to the overheating of the outer surface of the cameback and undercuring of the camelback at the innerface between the camelback and the tire carcass.

An object of this invention is to provide a method of vulcanizing retreaded tires without overheating the new rubber or camelback at the tread of the tire and insuring that the camelback at the innerface between the carcass and camelback is not undercured.

Another object of this invention is to provide a method of vulcanizing retreaded tires which considerably reduces the cure time in the retread mold and which is adaptable to a production cycle.

Other objects and advantages of the invention will become apparent from a reading of the following specification and the accompanying drawings in which.

Figure 1:
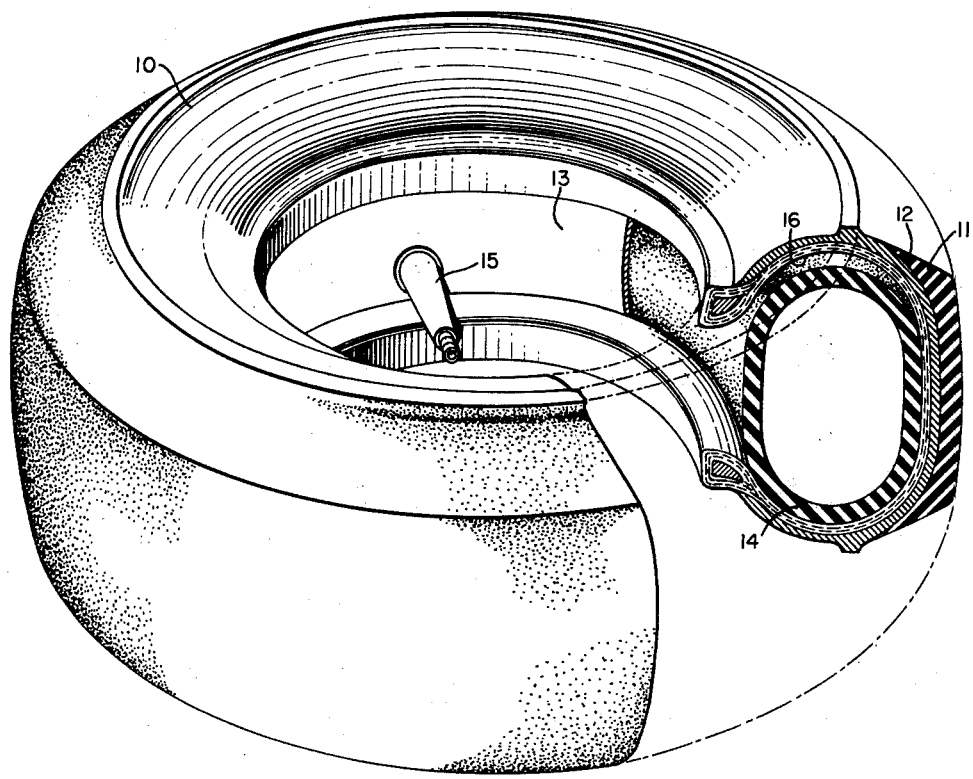
FIG. 1 is an isometric view of a retreaded tire with parts broken away showing an uninflated airbag therein.

In the preferred embodiment of this invention, the tire 10 which has been previously prepared by application of unvulcanized camelback 11 to the rasped and otherwise prepared undertread 12 of the tire, is mounted upon a conventional retreading rim 13 having a conventional curing bag 14 situated within the tire with the curing bag valve 15 extending through the rim 13.

Figure 2:
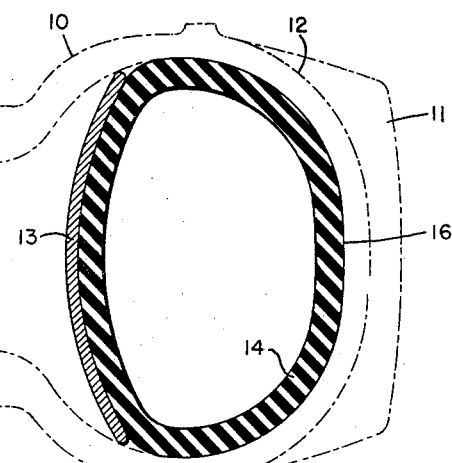
FIG. 2 is a cross-sectional view of a retreaded tire and air bag after inflation of the air bag.

With the tire, curing tube, and rim thus assembled, the tire is laid upon a horizontal surface as shown in FIG. 2 and steam is injected through the valve 15 into the curing bag 14. The steam is of sufficient temperature and pressure to readily expand the curing tube 14 against the inner crown surface 16 of the tire and to preheat the carcass 10 without raising the temperature of the camelback 11 to its vulcanizing temperature. It has been found that the injection of 20 p.s.i. steam at a temperature of 260° F. into the curing bag for a period of time slightly less than the curing time in the mold suffices to materially raise the temperature of the carcass without raising the temperature of the camelback 11 to its vulcanizing temperature. The temperature of the undertread 12 will be raised to about 160° F. whereas the temperature of the carcass will be more than that temperature, and the temperature of the camelback will be less than 160° F.

After this preliminary preheating step, the steam is released from the air bag through the valve 15 and any condensate or water existing in the air bag 14 is likewise drained or ejected from the bag. The tire, uninflated air bag, and rim assembly is then immediately inserted within a conventional tire curing mold, and the camelback 11 is vulcanized. This process is repeated from tire to tire so that as each tire goes into the mold the carcass is hot but the tread rubber or camelback is well below curing temperature. It is thus seen that the preheating step adapts itself readily to a producton cycle so that one tire can be preheated while a like tire is being given its cure in the mold.

Figure 3:
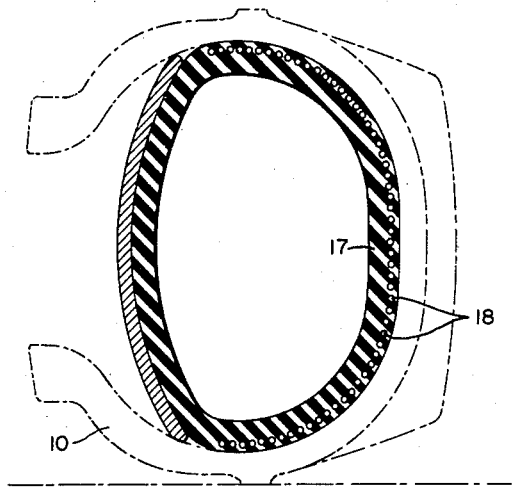
FIG. 3 is a view similar to FIG. 2 showing an air bag having electrical heating wires embedded in the outer periphery thereof.
Figure 4:
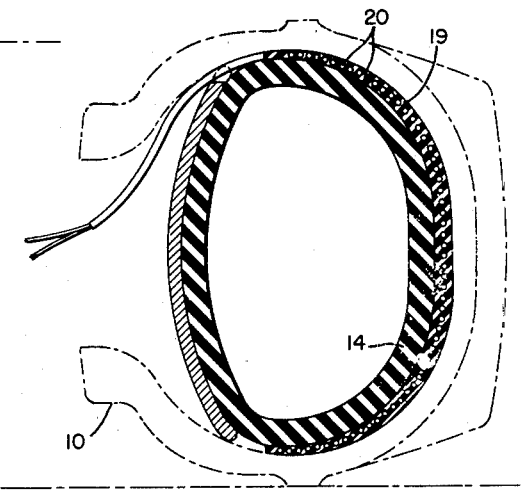
FIG. 4 is a view similar to FIG. 2 having an electrical heating pad situated between the air bag and the internal surface of the tire.

FIGS. 3 and 4 show modifications of the apparatus for performing the method of this invention wherein, as shown in FIG. 3, the curing bag 17 is provided with a plurality of resistant heating wires 18, or alternately, as shown in FIG. 4, an electrical heating pad 19 having resistant heating wires 20 may be interposed between bag 14 and the internal surface of the tire. Such electrically heated bags or pads are shown and described in U.S. Patent 2,929,909. Electrical current is supplied continuously or intermittently to the wires 18 or 20 to effect the preheating of the tire carcass prior to insertion of the tire and bag into the mold. During the preheating step air under pressure is supplied to the bag to expand the bag and/or pad 19 against the crown of the tire.

As a result of using this new vulcanizing method for recapping or retreading tires, the curing time in the mold is substantially reduced, and consequently production capacity of the mold is increased.

The amount of such increase will, of course, vary with different sizes of tires but by way of example, the curing time in the mold of a standard truck tire cured according to the method of this invention was reduced by one-third of the curing time in the mold of the conventional method. A standard truck tire 10.00-20 cured according to the regular conventional method required 120 minutes in the mold whereas the same tire cured according to the method of this invention required only 80 minutes within the mold.

From the foregoing, it is evident that this new method of vulcanizing retreaded tires is especially applicable to the problems of retreaders who are temporarily confronted with increased production which must be effected promptly and without the cost and delay incident to acquiring new mold equipment. Furthermore, the invention assures that the undertread or innerface between the carcass of the tire and the camelback will not be undercured, or that the tread surface is overcured.

While certain representative embodiments and details have been shown for the purpose of illustrating the invention, it will be apparent to those skilled in this art that various changes and modifications may be made therein without departing from the spirit or scope of the invention.

What is claimed is:

1. A method of vulcanizing a retreaded pneumatic tire comprising, inserting a toroidal shaped, expandable, inflatable, full circle, curing bag into said retreaded tire having means for heating at least the crown area of said bag, injecting a pressurized fluid into said bag to expand the external surface thereof against the internal surface of the tire while said tire is unconfined, applying heat to the internal surface by activating said heating means to heat the carcass of said tire to a temperature close to the vulcanizing temperature of rubber, exhausting said pressurized fluid from said bag after said carcass has been heated to close to the vulcanizing temperature of rubber, inserting the tire and bag into a retreading mold while the carcass is still hot, inflating said bag to hold the tire in contact with said mold under pressure and vulcanizing the retread of said carcass within said mold.

2. A method of vulcanizing a retreaded pneumatic tire comprising, inserting a toroidal shaped, expandable, inflatable, full circle, curing bag into a retread tire, holding said tire and bag in a horizontal position without confining the expansion thereof, injecting steam into said bag of sufficient pressure to expand the bag against the carcass, maintaining said steam pressure at a temperature and pressure for a sufficient period of time to heat the carcass to a temperature close to the vulcanizing temperature of rubber, exhausting said steam from the bag including the resulting condensate after the carcass has been so heated, inserting the tire and bag into a retreading mold while the carcass is still hot, inflating said bag to hold the tire in contact with said mold under pressure and curing the retread of said carcass within said mold.

3. A method of vulcanizing a retreaded pneumatic tire comprising, inserting a toroidal shaped, expandable, inflatable, full circle, curing bag into a retreaded tire, said curing bag having electrical heating means adjacent the external surface thereof in at least the crown area of the tire, injecting pressurized fluid into said bag, energizing said electrical heating means for a sufficient period of time to raise the temperature of said carcass close to the vulcanizing temperature of rubber, exhausting said pressurized fluid from said bag, inserting the tire and bag into retreading mold while the carcass is still hot, inflating said bag to hold the tire in contact with said mold under pressure and curing the tire tread within said mold.

References Cited in the file of this patent

UNITED STATES PATENTS

| | | |
|---|---|---|
| 1,271,843 | Bradley | July 9, 1918 |
| 2,304,663 | Smith et al. | Dec. 8, 1942 |
| 2,822,576 | Rowe | Feb. 11, 1958 |
| 2,855,629 | Barefoot | Oct. 14, 1958 |